United States Patent [19]

Nakayama

[11] Patent Number: 4,511,025
[45] Date of Patent: Apr. 16, 1985

[54] ARTICLE HOLDING APPARATUS OF ROTARY TYPE

[75] Inventor: Toshikazu Nakayama, Yokohama, Japan

[73] Assignee: Kirin Beer Kabushiki Kaisha, Tokyo, Japan

[21] Appl. No.: 432,269

[22] Filed: Oct. 1, 1982

[30] Foreign Application Priority Data

Oct. 6, 1981 [JP] Japan .................. 56-148655[U]

[51] Int. Cl.³ ........................... B65G 29/00
[52] U.S. Cl. .................................. 198/377
[58] Field of Search ............. 198/377, 394, 689; 294/64 R

[56] References Cited

U.S. PATENT DOCUMENTS

| | | | |
|---|---|---|---|
| 1,870,694 | 8/1932 | Strickler | 294/64 R |
| 3,216,550 | 11/1965 | Cox | 198/377 |
| 3,934,714 | 1/1976 | Matsumoto | 198/394 |
| 4,146,262 | 4/1979 | Van Groenestijn | 294/64 R |
| 4,394,898 | 7/1983 | Campell | 198/377 |

Primary Examiner—Joseph E. Valenza
Assistant Examiner—Kyle E. Shane
Attorney, Agent, or Firm—Lester Horwitz

[57] ABSTRACT

An improved apparatus for firmly holding a plurality of articles in the form of a bottle or the like on a rotary table has a plurality of supporting mechanisms for supporting the articles with the aid of attractive force generated under reduced pressure. The supporting mechanisms are adapted to rotate about the axis thereof while they revolve round the axis of the apparatus. The respective supporting mechanisms are located at an equal distance along the periphery of a circle on the table. The supporting mechanism comprises a cylindrical support having a flared head and a suction cup fitted in a central cavity of the flared head, the suction cup being in communication with a vacuum source by way of an axially extending through hole in the support. The flared head of the support preferably has a frictional disc fixedly secured to its upper surface and is located flush with the cupping surface of the suction cup. The supporting mechanisms are rotated with the aid of a belt driving system which is arranged outside of the circle along which they are rotatably held. The belt driving system includes two pulleys, an endless belt extended around the pulleys and a tension control pulley, the endless belt being adapted to come in engagement with pulleys fixedly secured to the lower part of the cylindrical supports.

9 Claims, 6 Drawing Figures

FIG. 4
FIG. 5
FIG. 6
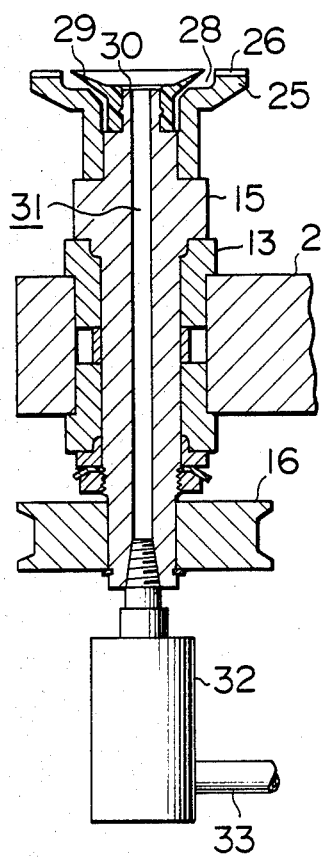
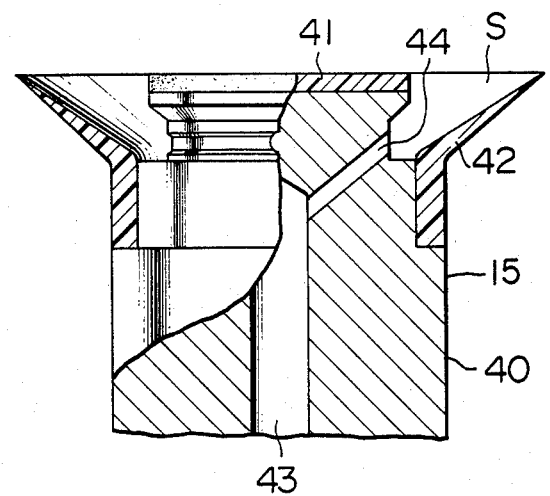
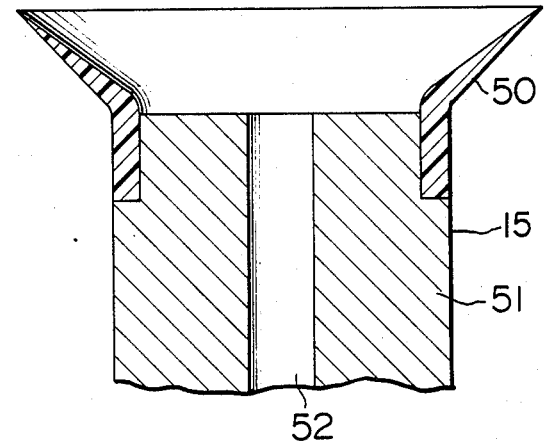

ARTICLE HOLDING APPARATUS OF ROTARY TYPE

BACKGROUND OF THE INVENTION

The present invention relates to an article holding apparatus of rotary type and more particularly to an improved apparatus for firmly holding a plurality of articles in the form of a bottle container or the like on supporting mechanisms for the purpose of inspecting, labelling, painting or the like, wherein the supporting mechnisms rotatably held on a rotating means in the form of a rotary table, a plurality of radially extending holding arms for holding the respective articles or the like are caused to rotate about the center axis thereof while they revolve round the center axis of the rotating means.

A hitherto known bottle inspecting apparatus of rotary type is generally constructed such that inspection is performed as to whether or not any damage or injury takes place with bottle containers (hereinafter referred to simply as bottle) conveyed from the preceding process or any foreign material is stuck onto their surfaces while the bottles revolving round the center axis of the rotary table are caused to rotate about their own center axis after they enter an inspecting section where an optical instrument is provided. The optical instrument generally has a light source disposed in a position opposite to the barrel portion of each bottle to be inspected and a plurality of light-receiving elements for receiving the light transmitting through the bottle. To allow the bottles to rotate about their own center axis in the inspecting section the conventional bottle inspecting apparatus is usually equipped with an arm gripper or the like means which is adapted to hold each of the bottles at their barrel portion to rotate it. However, it is pointed out as a drawback inherent to the conventional bottle inspecting apparatus of the above kind that the arrangement of the arm grippers in the inspecting area inhibits smooth inspecting operation for the whole surface of the respective bottles because the arm grippers shield the light emitted by the light source.

The conventional bottle rotating mechanism includes a sun gear and a pinion both of which are in meshing engagement with one another, said pinion being fixedly fitted onto a support adapted to rotatably hold a bottle to be inspected. As the pinion rolls round the periphery of the sun gear while they mesh with one another, the bottle is caused to rotate about the same center axis as that of the pinion.

However, due to the arrangement of the sun gear meshing directly with the plural pinion gears disposed at an equal distance along the periphery of a circle, noisy sound is generated during the operation of the gears. Further, due to the arrangement of no slippage taking place in the power transmission system, no smooth power transmission is achieved, resulting in quick starting and stopping of rotation of the bottles. Thus, the bottles are held on the rotary table unstably. Another drawback of the conventional bottle inspecting apparatus of this kind including the sun gear and the plural pinions is that a complicated clutching mechanism is required when the bottle rotating section is defined within a part of the periphery of the revolving circle.

SUMMARY OF THE INVENTION

It is an object of the present invention to provide a rotary type article holding apparatus which ensures firm holding of articles such as bottles or the like on a rotating means in the form of a rotary table or the like without necessity for the conventional gripping means such as an arm gripper or the like which is apt to obstruct optical inspection.

It is other object of the present invention to provide a rotary type article holding apparatus in which it is easy to place the article on holding means in the form of a suction cup before an inspecting operation and remove the same after completion of the inspecting operation.

It is another object of the present invention to provide a rotary type article holding apparatus which ensures that the articles are rotated about the center axis of the holding means while they revolve round the center axis of the rotating means.

It is still another object of the present invention to provide a rotary type article holding apparatus which is simple in structure and can be manufactured at an , inexpensive cost. According to this invention there is provided an apparatus for firmly holding articles adapted to rotate about the center axis of each of supporting mechanisms while they revolve around the center axis of the apparatus comprising a rotating means in the form of a table, a plurality of radially extending arms or the like adapted to rotate about the center axis of the apparatus, a plurality of supporting mechanisms rotatably held on said rotating means to hold the article thereon, said supporting mechanisms being located at an equal distance along the periphery of a circle on the rotating means, a rotating device for rotating the respective supporting mechanism about the axis of the latter while they revolve around the axis of the apparatus, and a plurality of holding means for firmly holding the article thereon with the aid of attractive force generated under reduced pressure, said holding means being disposed on the top end part of the respective supporting mechanisms. The nature, utility, and further features of this invention will be more clearly apparent from the following detailed description with respect to a preferred embodiment of the invention when read in conjunction with the accompanying drawings.

BRIEF DESCRIPTION OF THE DRAWINGS

In the accompanying drawings:

FIG. 4 is a vertical sectional view of an essential part of the apparatus in FIG. 2, shown in an enlarged scale;

FIG. 5 is a partial sectional view of a supporting mechanism for the apparatus in accordance with a modified embodiment of the present invention; and FIG. 6 is a sectional view of a supporting mechanism for the apparatus in accordance with another modified embodiment of the present invention, shown in the same enlarged scale as in FIG. 5.

DETAILED DESCRIPTION OF THE INVENTION

Figure 1:
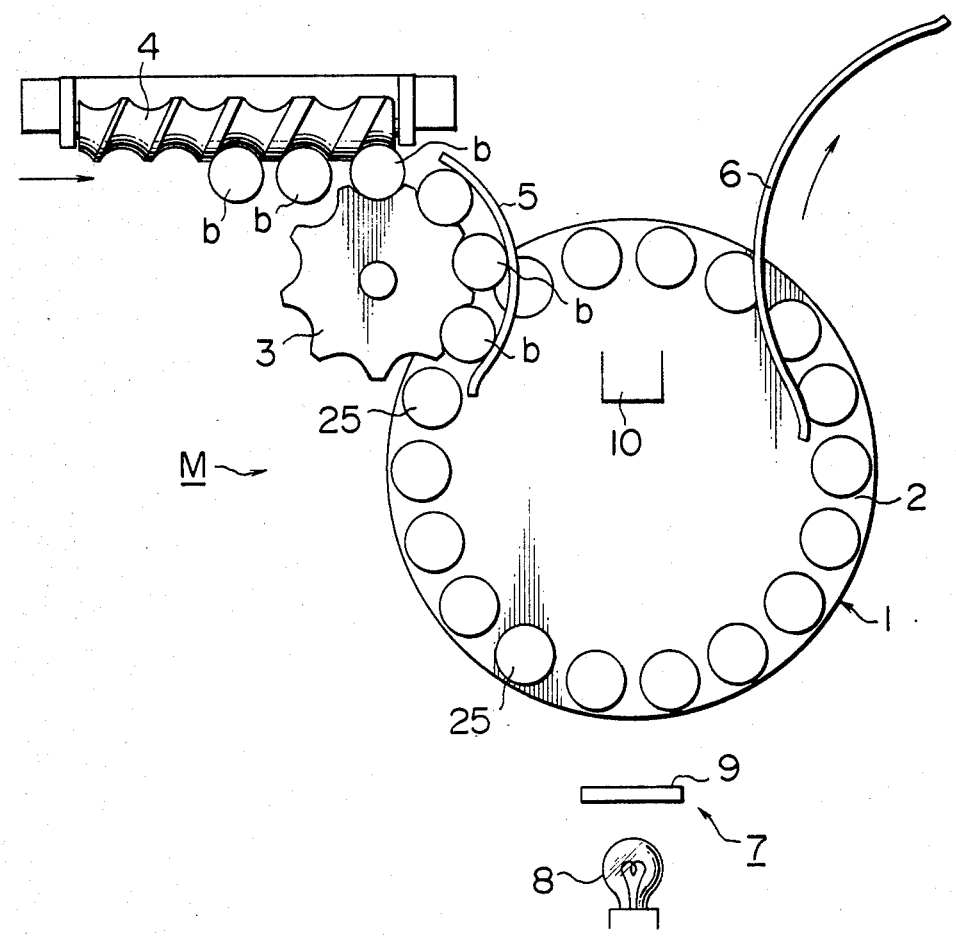
FIG. 1 is a plan view of a bottle inspecting apparatus to which an article holding apparatus is applied.

In FIG. 1, a bottle inspecting apparatus M has an article holding apparatus 1 of the present invention in which a plurality of bottles b are successively rotatably held. The apparatus 1 has a rotary table 2 on the periphery of which the bottles are held at equal intervals. There is provided a rotary star wheel 3 for feeding each of the bottles b to the periphery of the rotary table 2, which rotary star wheel 3 is located close to the rotary table 2. Near the star wheel 3 is provided a rotary screw feeder 4 which functions to adjust the distance between two adjoining bottles fed continuously by a conveyor belt (not shown). An arched guide plate 5 for guiding the bottles b is fixedly disposed along the periphery and another guide plate 6 for feeding the bottles b from the rotary table 2 to the next process is also fixedly disposed opposite to the guide plate 5.

When the bottles b are rotated on the rotary table 2, they are inspected by an optical inspecting means 7 comprising a light source 8, a diffusion plate 9 facing the barrel portion of each bottle b carried on the table 2 and light-receiving elements 10, 10 disposed over the central portion of the table 2. The light emitted from the light source 8 is diffused by the plate 9 to pass through the barrel portion of the bottles. The light-receiving elements 10 receive the light passing through each bottle b to sense as to whether or not there are any damages or injuries. This type of optical inspecting means is well known.

Figure 2:
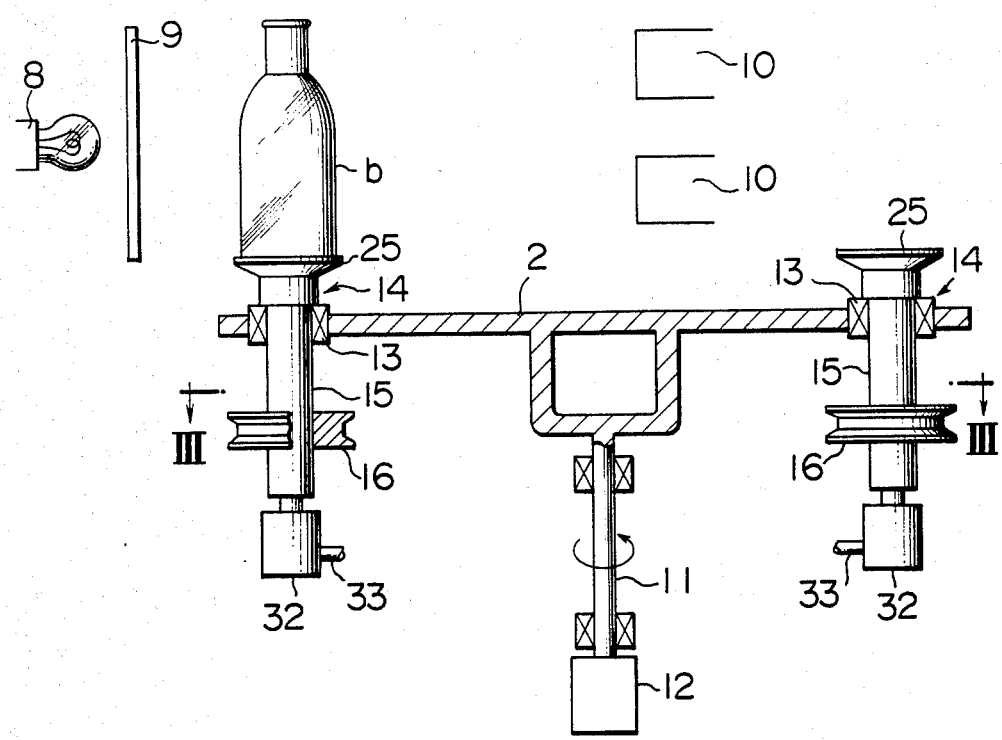
FIG. 2 is a vertical sectional view of a rotary type article holding apparatus in accordance with a preferred embodiment of the present invention, wherein the latter is applied to a bottle inspecting apparatus.

In FIG. 2, the rotary table 2 includes a downwardly extending shaft 11 which is operatively connected to an output shaft of a motor (not shown) by way of a speed reduction mechanism 12. Further, the rotary table 2 is held rotatably about the axis of the shaft 11 by means of bearings or the like.

Figure 3:
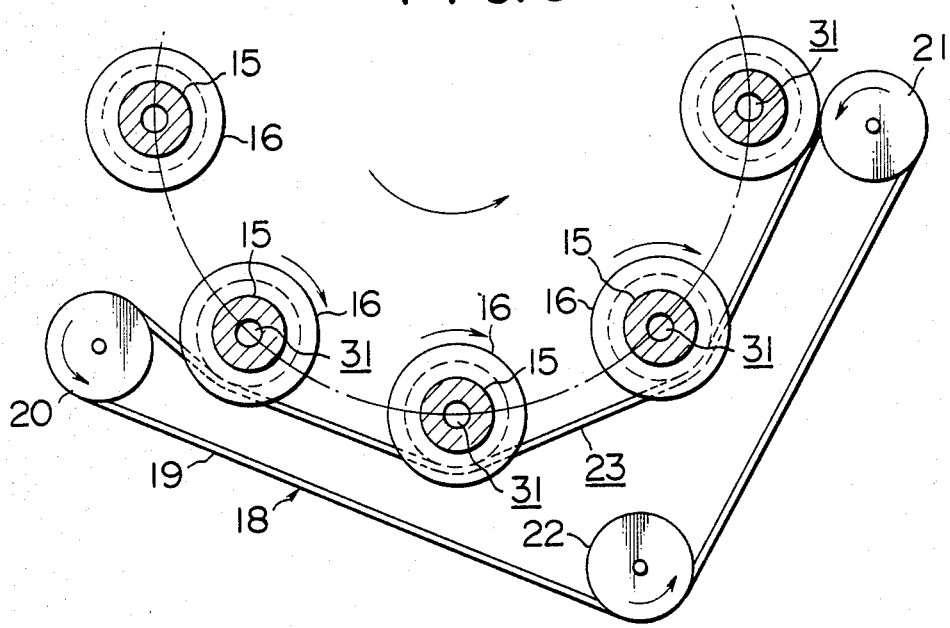
FIG. 3 is a sectional plan view of the article holding apparatus, taken in line II—II in FIG. 1.

A plurality of fitting holes are provided at an equal distance along the periphery of a circle on the rotary table 2 so that the same number of supporting mechanisms 14 are rotatably supported on the fitting holes by way of thrust bearings 13. Each supporting mechanism 14 includes a sleeve-shaped support 15. A pulley, preferably, a V-pulley 16 is fixedly secured to the lower part of the support 15 and an endless belt 19 of a rotating mechanism 18 is arranged in such a manner as illustrated in FIG. 3 so that it is operatively engaged with the respective pulleys 16. The rotating mechanism 18 includes a driving pulley 20 and a driven pulley 21 and the endless belt 19 extends around both the pulleys 20 and 21. The tension of the endless belt 19 is controlled by means of a tension pulley 22 so that it is properly engaged with the V-pulleys 16 during travelling by way of the inner track 23 so as to rotate the supports 15 about their axes. Obviously, the endless belt 19 has a cross-sectional configuration of double-V so that it can engage with each V-pulley 16 and, the above pulleys 20, 21, 22 on its both sides respectively.

The support 15 has a flared top portion which constitutes an expanded head 25. As is apparent from FIG. 4, the expanded head 25 is fitted with a flange-shaped frictional disc 26 at its upper end, said frictional disc 26 constituting a holding plane on which a bottle container b (hereinafter referred to simply as bottle) is to be placed as an article to be inspected.

As shown in FIG. 4, the flared head 25 is provided with a central cavity 28 which is opened upward and a suction cup 29 is firmly fitted into said cavity 28. Specifically, the suction cup 29 is firmly held by fitting the lower part thereof onto an upwardly extending projection 30 in the cavity 28. The upper peripheral end of suction cup 29 is located substantially flush with the disc 26. Further, the support 15 has a suction hole 31 which extends therethrough in the axial direction and a part of a rotary seal 32 is fitted into the bottom part of said suction hole 31, the rotary seal 32 being in communication with a vacuum source (not shown) by way of a piping 33. A change-over valve or the like means (not shown) is disposed midway of the piping 33. Since the suction cup 29 is in communication with the vacuum source by way of the suction hole 31, the rotary seal 32 and the piping 33, the peripheral surface of the suction cup 29 is brought into close contact with the bottom surface of the bottle b to be inspected, by actuating the change-over valve. As a result the bottle b is firmly held on the holding surface.

The operations of the bottle inspecting apparatus constructed in the above-described manner will be described below.

The bottles b conveyed successively by means of the belt conveyor, the screw feeder 4, the star wheel 3, etc. are placed on the supports 15 one after another which are rotatably supported by means of the supporting mechanisms 14 on the rotary table 2. The respective bottles b on the supports 15 are forcibly drawn downward by reduced pressure which is transmitted from the vacuum source to the suction cup 29 by way of the piping 33 and the suction hole 31 by actuating the change-over valve whereby the bottom surface of each bottle b comes in tight contact with the peripheral surface of the suction cup 29. Thus, the bottles b are firmly held on the holding surfaces of the supports 15 respectively. Owing to the arrangement of the frictional disc 26 having a high frictional coefficient it is ensured that the bottles to be inspected are reliably held without any fear of slippage.

As the rotary table 2 is rotated, the bottles b on the supports 15 revolve around the axis of the rotary table 2. When each bottle b enters the inspecting section, the V-pulley 16 on the support 15 comes in operative engagement with the moving endless belt 19 whereby the bottle b is caused to rotate about the axis of the support 15. During the moving of the bottle b through the inspecting section the V-pulley 16 is driven by the moving endless belt 19 by way of frictional engagement therebetween. Thus, the bottle b is caused to rotate about its axis while it revolves about the axis of the rotary table 2 and inspection is performed as to whether or not any damage or injury to the bottle has taken place with it or any foreign material is stuck on it during the revolution and rotation thereof.

When the bottle b leaves the inspecting section, the V-pulley 16 becomes disengaged from the moving endless belt 19 and thereafter the bottle b continues its revolution without its own rotation. Finally, the bottle b is removed, along the guide plate 6, from the rotary table 10 at the exit position and it is then conveyed to the next station or process. To ensure smooth start and stop when each bottle b starts its operation and completes the same, the tension of the moving endless belt 19 is controlled by means of the tension pulley 22. When each bottle b is to be removed after completion of the intended inspection, communication between the suction cup 29 and the vacuum source is interrupted and then the suction hole 31 is exposed to the atmosphere by actuating the change-over valve (not shown). Then the bottle b is ready to be removed from the suction cup 29.

After the bottle b is removed, each empty support 15 is brought back to the original position where the next bottle b to be inspected is to be firmly held thereon under reduced pressure.

The subject invention has been described above with respect to the illustrated embodiment in which articles to be inspected are firmly held by a combination of supports and a rotary table, but the present invention should not be limited only to this. Alternatively, a plurality of radially extending holding arms may be employed in place of the rotary table, the holding arms having a support rotatably held at their free end respectively.

Further, the present invention has been described with respect to the embodiment in which each flared head of the respective support has a central cavity and a suction cup is coaxially disposed in said central cavity. However, the present invention should not be limited only to this and the suction cup may be designed in such a modified manner as illustrated in FIG. 5. Specifically, the modified suction cup is constructed such that a support 40 is provided with a frictional disc 41 at its top surface so as to constitute a holding surface and the lower part of a suction cup 42 is fitted onto the stepped part of the support 40, the suction cup 42 being located in a coaxial relation relative to the holding surface of the support 40. The inner suction space S of the cup 42 is connected to a suction hole 43 via a slanting small hole 44.

Further, another modified suction cup as illustrated in FIG. 6 may be employed particularly when articles having a light weight such as an ampule or the like are to be firmly held on the supporting mechanism 14. This modified embodiment consists of a suction cup 50 fixedly fitted onto the top end part of the support 51 of the supporting mechanism 14 which is in communication with the vacuum source so as to firmly hold an article under reduced pressure and directly carry the weight of the same by itself. A suction hole 52 is formed in the support 51.

Since the apparatus in accordance with the present invention is constructed such that articles to be inspected are firmly held on the support mechanisms under reduced pressure and revolve while they rotate, as described above, there is no necessity for the conventional gripping mechanisms such as arm grippers or the like which serve for holding the barrel portions of the articles such as bottles or the like. As a result the apparatus can be constructed with a smaller number of parts and components.

Further, since the apparatus is constructed so that the supports on the supporting mechanisms cooperate with suction cups which are in communication with the vacuum source, articles having a heavy weight can be reliably held without any danger of damaging or injuring the suction cups.

When the present invention is applied to a bottle inspecting apparatus, bottle holding is achieved merely by placing a bottle on the support without the necessity of the conventional bottle guide, gripper or the like. Thus, it is possible to inspect the entire surfaces of the respective bottles which are easily and firmly held on the supports and removed therefrom after completion of the intended inspection.

Finally, it should be of course understood that the present invention has been described with respect to the rotary type bottle inspecting apparatus but it should be not limited only to this and it may be employed for other kinds of applications, for instance, labelling, painting and others without any departure from the spirit and scope of the invention.

In the above embodiment, the endless belt 19 is rotated by the driving pulley 20. However, the belt 19 may be stationary by stopping the rotation of the pulleys 20, 21, 22 and in this case each V-pulley 16 is rotated while it is moved along the stationary inner track 23 by the rotary table 2.

What is claimed is:

1. An apparatus for firmly holding bottle like containers to rotate about a center axis of each of a plurality of supporting mechanisms at high speed while they revolve around a center axis of the apparatus comprising in combination:

a rotating means adapted to rotate about the center axis of the apparatus:

a plurality of supporting mechanisms rotatably held on said rotating means to hold a bottom of each container thereon so that the container is in an upright position, said supporting mechanisms being located at an equal distance along a periphery of a circle on the rotating means;

an endless belt for rotating each of said supporting mechanisms in one direction about the axis of the latter while the latter revolve around the axis of the apparatus;

means for controlling the tension in the endless belt;

said endless belt being disposed along a part of a periphery of the rotating means so as to contact each support mechanism to thereby rotate the support mechanism when the support mechanism passes within a region where the endless belt is disposed; and a plurality of holding means for firmly holding the containers thereon with the aid of attractive force generated under reduced pressure, a vacuum source generating said reduced pressure, a suction cup being in communication with said vacuum source and cooperating with a frictional disc disposed on a top end part of each supporting mechanism.

2. An apparatus according to claim 1, wherein the holding means on the respective supporting mechanisms comprises a suction cup on which a container is firmly held under reduced pressure, said suction cup being in communication with a vacuum source.

3. An apparatus according to claim 1, wherein the supporting mechanism comprises a support adapted to carry the weight of the container, said suction cup is disposed in a coaxial relation with respect to an upper holding surface of said support.

4. An apparatus according to claim 1, wherein the endless belt is supported by at least two pulleys, the endless belt extending around said pulleys, said endless belt being adapted to come into engagement with a number of pulleys fixedly fitted onto the lower part of the supporting mechanisms as the rotating means rotates about the center axis of the apparatus.

5. An apparatus according to claim 3, wherein the support is constructed in the form of a cylinder which is rotatably held in a fitting hole on the rotating means, the upper holding surface of the support being located substantially flush with an upper periphery of the suction cup.

6. An apparatus according to claim 3, wherein the support has a flared head, a frictional disc being fixedly secured to the upper surface of the flared head so as to serve as an article holding surface.

7. An apparatus according to claim 6, wherein the flared head of the support is provided with a central cavity at the upper part thereof in which the suction cup is firmly fitted, the latter being in communication with the vacuum source by way of an axially extending through hole in the cylindrical support.

8. An apparatus according to claim 5, wherein the cylindrical support has a frictional disc fixedly secured to the upper surface thereof, said frictional disc serving as a holding surface, a lower part of the suction cup being firmly fitted onto an upwardly extending projection of the support so that the suction cup is located inside of the flared head of the support.

9. An apparatus according to claim 3, wherein the supporting mechanism comprises a support with a frictional disc fixedly secured to the upper surface of the support and a suction cup firmly fitted onto a stepped portion of the support so that the suction cup is located outside of the frictional disc, said suction cup being in communication with the vacuum source.

* * * * *

UNITED STATES PATENT AND TRADEMARK OFFICE
CERTIFICATE OF CORRECTION

PATENT NO. : 4,511,025
DATED : April 16, 1985
INVENTOR(S) : Toshikazu Nakayama

It is certified that error appears in the above-identified patent and that said Letters Patent is hereby corrected as shown below:

Column 6 line 40 after "reduced pressure" insert --said holding means being disposed on a top end part of their respective supporting mechanisms,--

Column 6, line 44, delete "a" and replace therefor --the--

Signed and Sealed this

Fifth Day of November 1985

[SEAL]

Attest:

Attesting Officer

DONALD J. QUIGG

Commissioner of Patents and Trademarks